March 24, 1936.　　　M. DAVIDSON　　　2,035,223
HEATING POT
Filed Oct. 22, 1935　　　2 Sheets-Sheet 1
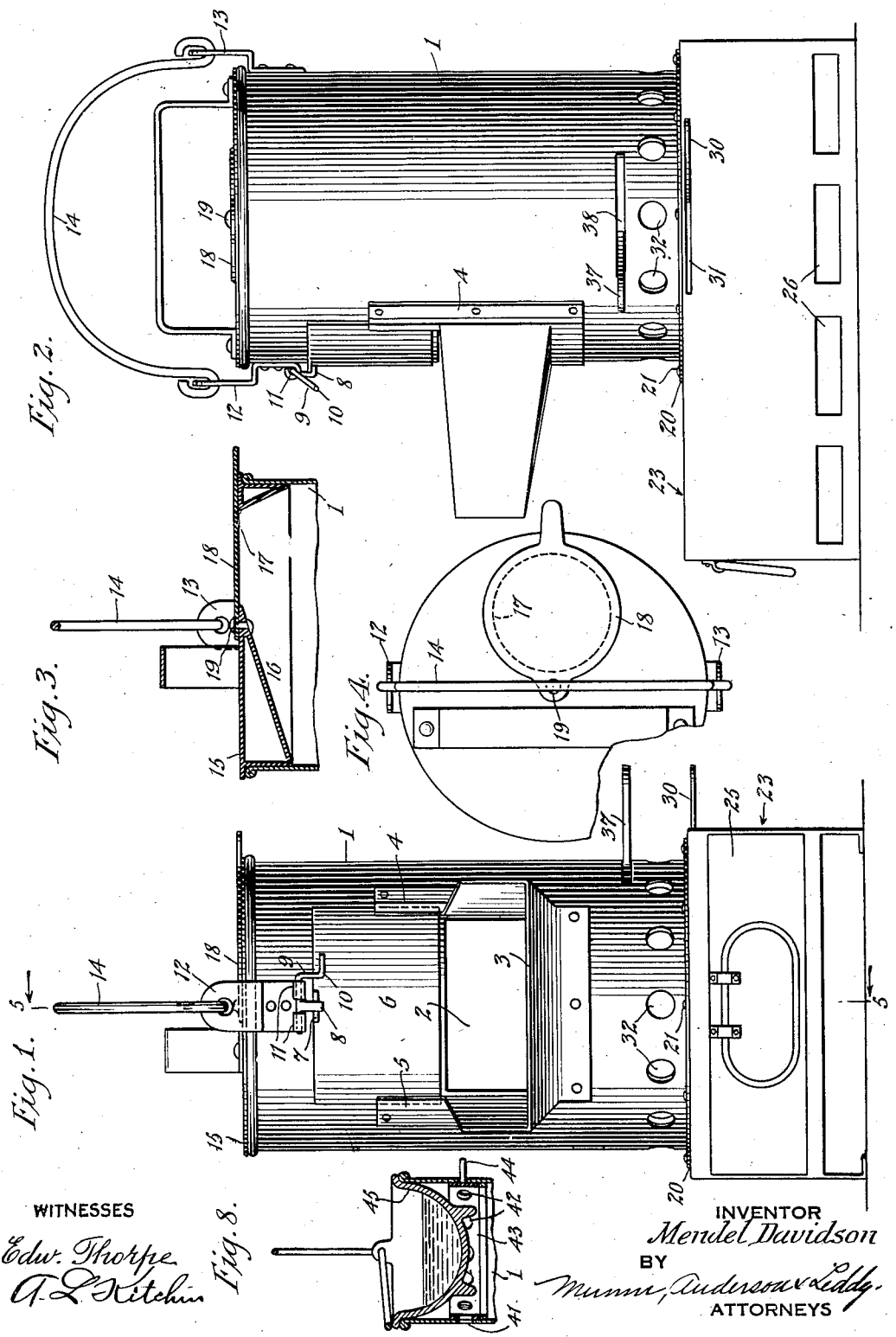
WITNESSES
Edw. Thorpe
A. L. Kitchin
INVENTOR
Mendel Davidson
BY
Munn, Anderson & Leddy
ATTORNEYS March 24, 1936.    M. DAVIDSON    2,035,223
HEATING POT
Filed Oct. 22, 1935    2 Sheets-Sheet 2

WITNESSES
Edw. Thorpe
A. L. Kitchin

INVENTOR
Mendel Davidson
BY
Munn, Anderson & Liddy
ATTORNEYS

Patented Mar. 24, 1936

2,035,223

UNITED STATES PATENT OFFICE 2,035,223

HEATING POT

Mendel Davidson, New Rochelle, N. Y.

Application October 22, 1935, Serial No. 46,203

2 Claims. (Cl. 126—77)

This invention relates to heating pots and particularly to an improved pot to be used by tinners, plumbers, and the like, the object being to simplify the operation of the heater by the provision of a common means to shake the ashes from the fire bed and to regulate the air for combustion to the fire box.

Another object of the invention is to provide an improved part having a combined cast iron fire box and air regulating shutter.

In the accompanying drawings—

Figure 1 is a front view of a heating pot disclosing an embodiment of the invention;

Figure 2 is a side view of the structure shown in Figure 1;

Figure 3 is a fragmentary vertical sectional view through Figure 2;

Figure 4 is a top plan view of the upper part of the pot shown in Figure 1;

Figure 8 is a vertical sectional view of the upper part of a modified form of the pot shown in Figure 1;

Figure 6:
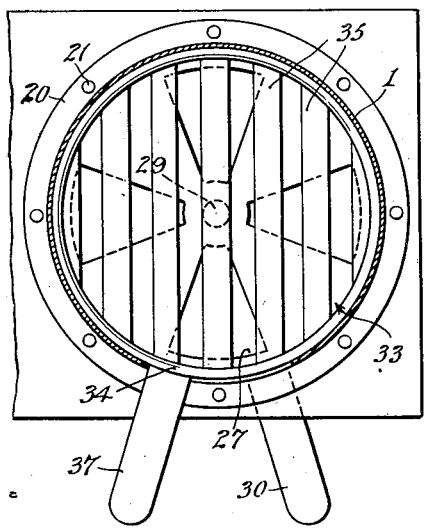
Figure 6 is a fragmentary sectional view through Figure 5 approximately on line 6—6, the shutter being shown in elevation.
Figure 5:
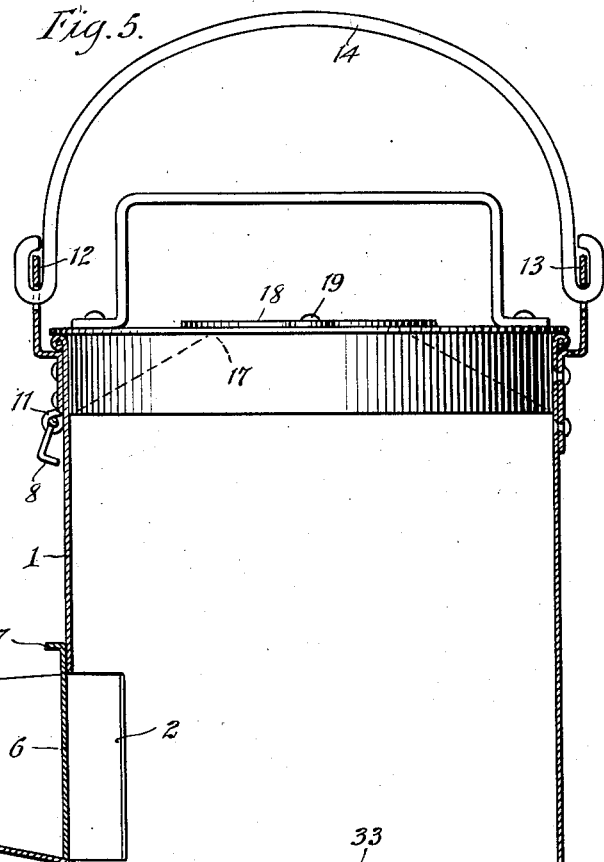
Figure 5 is a sectional view through Figure 1 approximately on line 5—5, the same being on an enlarged scale.

Referring to the accompanying drawings by numeral, 1 indicates the body of the pot which is preferably made of sheet metal and which is fully open at the top and bottom. Body 1 is also provided with an opening 2 and adjacent this opening exteriorly is provided a tool rest 3. Alongside the tool rest 3 is provided guide strips 4 and 5 in which the door 6 is slidingly mounted. As shown in Figure 1 the door is fully open, but as shown in Figure 5 it is fully closed. The door 6 is merely an arc-shaped piece of sheet metal having an outturned flange 7 adapted to receive the hook 8 of the catch 9 which catch is provided with a handle or hand member 10 whereby it may be swung in the knuckles 11 formed from an extension of the bail strap 12.

It will be noted that the pot is provided with a second bail strap 13 so as to guide the bail 14. When the pot is in use, the upper part may be left completely open or may be closed partly or completely by the cover 15 which is preferably of sheet metal though it could be made from casting or other material. This covering is provided with an inclined inner wall 16 which is adapted to direct smoke and the draft through the opening 17. A covering door 18 is connected with top 15 by a suitable rivet 19. The rivet is sufficiently loose to permit the door 18 to be swung back and forth in a plane parallel to the top surface of the top 15 whereby opening 17 may be exposed.

At the end opposite the cover 15, the body 1 is preferably provided with an annular flange 20 so as to accommodate the various rivets 21 whereby the body 1 is secured to the top plate 22 of the base 23. Base 23 is provided with suitable supports or runways 24 for accommodating the drawer 25. Below the runways 24 there are provided a number of openings 26 to permit circulation of air and a proper cooling of the ashes which may drop down into the drawer 25. The top plate 22 immediately below the body 1 is provided with a number of apertures 27 which are adapted to be closed by the shutter 28 which is pivotally mounted at 29 and which may be actuated by a suitable handle 30 for opening and closing. A suitable slot 31 shown in Figure 2 is provided in one of the side walls of base 23 to permit handle 30 to properly function. Normally, this shutter maintains the apertures 27 closed. This shutter is merely used as a combined closure and dumping grate for the ashes in the low part of the tubular damper 34.

Figure 7:
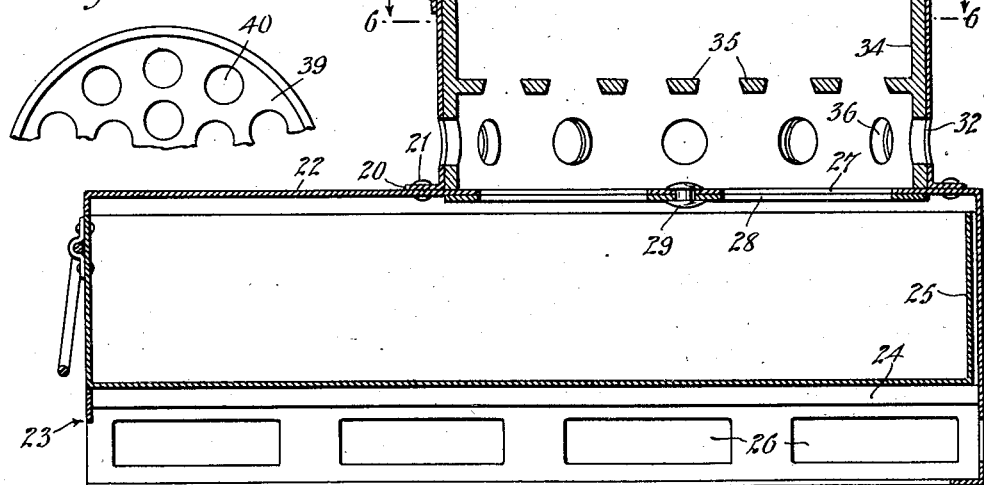
Figure 7 is a fragmentary top view of a modified form of shutter to that illustrated in Figure 5.

The air passing into the bottom part of body 1 enters through a number of apertures 32 in the bottom portion of the body. Apertures 32 are arranged in a plane parallel to plate 22 and normally in a horizontal plane. A tubular or drum damper 33 is arranged immediately above the damper 28, said tubular damper having a tubular portion 34 and a number of grate bars 35 as well as a number of apertures 36, the apertures 36 being in the same plane as apertures 32 and of the same size so that they may be brought into full registry therewith or partial registry as preferred. A handle 37 is connected with the tubular shutter 33 so as to shift the same back and forth, said handle extending through the slot 38 of body 1. The tubular shutter 33 may be formed of sheet metal, but is preferably made from cast iron and of preferably greater thickness than the sheet metal walls of body 1. Also, it will be noted from Figure 5 that the apertures 36 are all below the grate bars 35. If desired, instead of having bars 35 a solid web 39 could be provided and a number of apertures 40 formed therein as shown in Figure 7.

When the device is in use charcoal or other fuel is placed on the grate bars 35 and ignited. The apertures 36 are preferably in alinement with apertures 32 so that a desired draft is secured. The door 18 may be thrown open to provide an opening at the top of the body or the entire cover 17 may be removed when the fire is first being started. At this time, the sliding door 6 is closed so that there will be a good draft upwardly. When the charcoal or other fuel has been properly ignited cover 15 is replaced and the door 18 closed more or less while door 6 is open more or less. Soldering irons or other implements may then be placed on the support or rest 3 with portions extending into the body 1 so as to be heated. If desired, the shutter 33 could be closed more or less to regulate the draft and also it could be moved back and forth quickly for shaking the grate freely after the pot has been in use sometime. When this is done, the shutter 20 is preferably open so as to allow the ashes to drop down directly into the pan 25. By the construction set forth, it will be seen that there are provided ample draft regulating means at the top and bottom of the pot and that all of the means are independent of any draft in the base 22.

Under some circumstances, the pot may be made in a slightly different way and a number of apertures 41 provided in the upper part and positioned to coact with the apertures 42 in a tubular shutter 43 which may be actuated by a handle 44 extending through a suitable slot in the body 1. This arrangement is desirable when a lead melting pot 45 is used as shown in Figure 8. When the pot 45 is to be used door 6 is usually closed and the cover 15 removed. When this has been done, the damper or shutter 33 may be regulated as desired and also the damper or shutter 43 may be regulated whereby an ample draft is secured and proper heat produced for melting or maintaining melted lead or other substance in pot 45.

I claim:

1. A heating pot including a tubular sheet metal body open at both ends, a base connected to one end of said body and closing the same, said body adjacent said base being provided with a number of apertures in the side thereof, a tubular shutter positioned within said tubular body at the bottom portion thereof and having a number of apertures in the side wall positioned to be moved into registry with the apertures in said body, said shutter being formed of cast iron and provided with integral bars forming a grate, said bars being intermediate the respective ends of the shutter whereby the portion of said shutter above said grate acts as a combustion chamber and the portion below the grate acts in the combined capacity of a shutter and an ashpit.

2. A heating pot including a tubular sheet iron body open at the top and bottom and formed with a plurality of draft openings near the bottom in a plane at right angles to the axis of the body, a cast iron tubular member rotatably mounted within said body at the bottom portion thereof, the axis of said tubular member being coincident with the axis of said body, said member intermediate its height having spaced grate bars forming a grate and spaced apertures in the side wall below said grate, last mentioned apertures being of the same size, in the same plane and equally spaced as said draft openings in said body, and a handle for rocking said tubular member to shake said grate and to bring the apertures in said member and the draft openings in said body into and out of registration.

MENDEL DAVIDSON.